No. 764,131. PATENTED JULY 5, 1904.
J. E. KELLER, Jr.
PNEUMATIC TIRE VALVE.
APPLICATION FILED SEPT. 8, 1903.
NO MODEL.
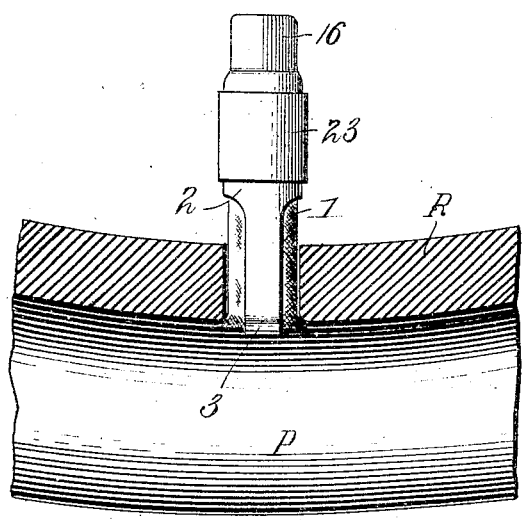
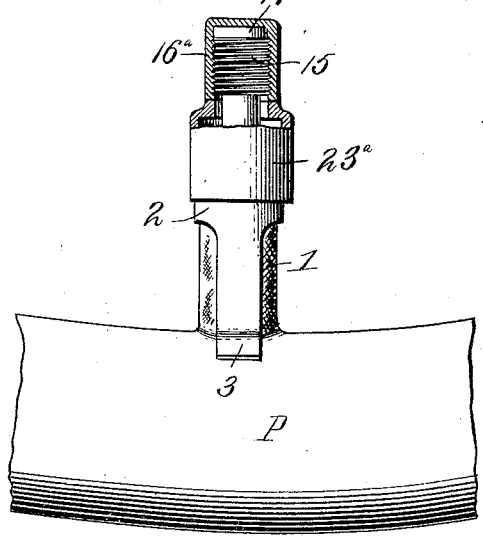
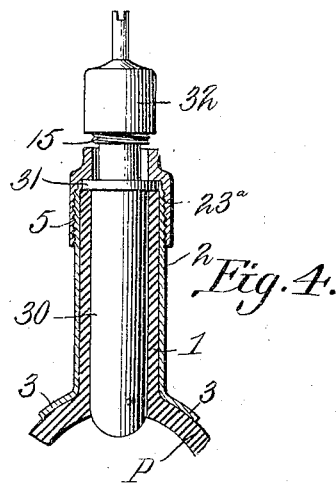
Witnesses
E. F. Stewart
Baxter Morton
John Esten Keller Jr., Inventor.
by C. A. Snow & Co.
Attorneys No. 764,131. Patented July 5, 1904.

UNITED STATES PATENT OFFICE.

JOHN ESTEN KELLER, JR., OF LITCHFIELD, CONNECTICUT.

PNEUMATIC-TIRE VALVE.

SPECIFICATION forming part of Letters Patent No. 764,131, dated July 5, 1904.

Application filed September 8, 1903. Serial No. 172,397. (No model.)

*To all whom it may concern:*

Be it known that I, JOHN ESTEN KELLER, Jr., a citizen of the United States, residing at Litchfield, in the county of Litchfield and State of Connecticut, have invented a new and useful Pneumatic-Tire Valve, of which the following is a specification.

This invention relates to valves for pneumatic tires for vehicle-wheels; and it consists in certain improvements in pneumatic-tire valves hereinafter described, shown in the accompanying drawings, and specified in the appended claims.

The principal object of the invention is to provide a pneumatic-tire valve with improved means for holding the valve in association with the tubular stem of the tire and with the rim of the wheel upon which the tire is mounted, so that the valve may be secured without using any of the ordinary wire-binding or clamping devices in general use.

A further object of the invention is to provide improved means for securing a valve in the stem of a pneumatic tire in such manner that the valve cannot be blown out, but can be conveniently and quickly removed from the tire-stem when it is desirable to do so.

In the drawings, Figure 1 is a view, partly in elevation and partly in section, of a portion of the rim of a vehicle-wheel and of the tire mounted thereon, showing the tubular tire-stem with the improved valve applied thereto. Fig. 2 is a longitudinal section through the tire-stem, the valve, and the portion of the tire to which the stem is attached. Fig. 3 is a sectional view through the valve and tire-stem, showing a modified form of retention and dust cap. Fig. 4 is a sectional view of the tire-stem, showing a valve of common structure provided with the improved devices for securing the valve in position in the tire-stem.

Referring to the drawings, in which corresponding parts are designated by similar characters of reference, R designates the rim of the wheel, and P the tire, which has a tubular stem, 1 of rubber, formed integral therewith.

In the form of the invention illustrated in Figs. 1 and 2 a collar 2, provided at the bottom with extensions 3, which are curved to fit the sides of the stem, is fitted on the stem with its ends substantially flush with the ends of the stem and having the ends of the extensions 3 bent outward along the inner face of the tire and disposed between the tire and the wheel-rim. The collar 2 is externally threaded near the top, as shown at 5, and its internal diameter corresponds exactly to the external diameter of the tire-stem.

Fitted within the tire-stem and in close contact therewith is a valve-casing 6, slightly constricted at the lower end to form a support for the spring 7, but leaving an opening 8 for the passage of air. At the top of the tube 6 is a small flange 9, beveled on its under surface, so as to have a slight spreading effect upon the tire-stem. When the spring-tube is in position, the flange 9 will be pressed firmly against the top of the tire-stem, as seen in Fig. 2. In the top of the valve-casing there is secured a valve-head 10, which comprises an externally-threaded tubular portion 11 at the bottom, the lower end of which is constricted to form a valve-seat 12 and which is screwed into the upper portion of the valve-casing. Above the tubular portion 11 there is a flange 13, which is spaced from the flange 9 on the valve-casing by a packing-washer 14. Above the flange the valve-head is reduced in diameter for reasons hereinafter to be explained, and above the reduced portion it is enlarged and presents an internally-threaded surface 15 for the engagement of a dust-cap 16, which is internally threaded. The dust-cap 16 may be of any preferred form, and is preferably provided with a piece of packing material 17, fitted within the top and having a central recess 18.

The valve-head is tubular throughout, and a valve 19, on the top of which is provided a small gasket 20, is mounted at the lower end of a valve-stem 21, vertically arranged within the head. The upper end of the stem 21 projects above the top of the head when the valve is closed and enters the recess in the packing at the top of the dust-cap. To prevent accidental loss of the valve when the valve-head is removed from the tire-stem, the valve-stem 21 has its upper end enlarged or distorted, as shown at 22. The valve 19 rests upon the spring 7 and is held thereby normally in contact with the valve-seat.

To secure the valve-head, the valve-casing, and the parts associated therewith in position, a retention-cap 23, internally threaded at the lower end and having an opening in the upper end for the passage of the valve-head, is mounted upon the collar 2 in the position shown in Fig. 2. The cap 23 presses against the flange on the valve-head and forces it and the parts below it downward toward the tire-stem, so that it is impossible for an increase of pressure within the tire to blow the valve-head out when the cap 23 is in position.

In the preferred form of the invention the cap 23 is channeled at 24 on its upper surface for the reception of a gasket 25, of rubber or other suitable material. The gasket 25 is disposed in position to contact with the margin of the dust-cap 16, and so coöperates with the packing in the top of the cap to prevent the entrance of dust into the valve.

In the modified form of the invention shown in Fig. 3 the dust-cap 16 is replaced by a dust-cap 16ᵃ, and the retention-cap 23 is replaced by a retention-cap 23ᵃ, whose upper surface is smooth and is unprovided with a rubber gasket. The modified structure is simpler than that shown in the preferred form of the invention and is of course less expensive, but its action is not quite so efficient in excluding dust from the interior of the valve.

In the modified form of the invention shown in Fig. 4 a valve-tube 30, containing the internal mechanism of the valve, which may be of any preferred form, is provided externally with a flange 31, adapted to contact with the upper end of the tire-stem. A dust-cap 32 is secured upon the top of the tube 30, and a collar 2 and a retention-cap of the form shown at 23ᵃ are employed to hold the valve-tube in association with the tire-stem and wheel-rim.

In assembling the parts of the valves shown in Figs. 1, 2, and 3 and applying them to a tire-stem the collar 1 will first be fitted on the stem and then the stem will be passed through the opening provided in the wheel-rim next the valve-casing, previously lubricated with any suitable material and attached to the valve-head, will be forced into the stem, and the retention-cap will then be secured upon the collar 2, this being rendered easy by the reduction in the diameter of the valve-head above the flange thereon. The reduced diameter of the valve-head permits the retention-cap to be positioned accurately with reference to the collar 2, regardless of the position of the valve-head, which may or may not be accurately centered with respect to the collar. After the retention-cap has been secured in position the dust-cap will be placed on the top of the valve-head and the valve will be completely protected.

To place the modified form of the valve shown in Fig. 4 in position in the tire-stem, the collar is first fitted over the stem as before, then the valve-tube is introduced into the stem and the flange forced into contact with the top of the stem. The retention-cap is next fitted on the collar, and finally the dust-cap is placed on the top of the valve-tube.

In order that the parts of the valve structure may be held with perfect security, the threads connecting the valve-head and the spring-tube are preferably cut in the reverse direction to the threads connecting the retention-cap and the collar 2. Thus if the threads in the valve-casing are left-hand threads the threads in the retention-cap will be right-hand threads. When the threads are reversely cut in this manner, the retention-cap will act as a check-nut for the valve-head. Similarly, it is desirable that the threads connecting the valve-head and dust-cap be cut in the same direction as those connecting the retention-cap and collar 2, and the internal threads in the valve-head for engagement with a pump connection will be cut in the same direction as those in the dust-cap.

While the invention has been described in the preferred forms of embodiment, it will be obvious that various changes in the details of construction may be made without departing from the spirit of the invention, and the right to make such changes is reserved.

Having thus described the construction and operation of my invention, what I claim as new, and desire to secure by Letters Patent, is—

1. The combination with a tire having a tubular stem formed integral therewith, and the rim of a vehicle-wheel having an opening for said stem, of valve mechanism fitted in the stem and having a flange extending over the end of the stem, a tubular collar surrounding the stem and having lateral extensions between the tire and the wheel-rim, and a retention-cap having an opening therein for the passage of the upper portion of the valve mechanism and adapted to engage with the flange on the valve mechanism, said retention-cap being positively secured to the tubular collar.

2. A pneumatic-tire valve comprising valve mechanism adapted for insertion into a tire-stem and comprising an open-top valve-head, a collar fitted over the tire-stem and having lateral extensions for engagement with the wheel-rim, a retention-cap engaging said collar to secure said valve mechanism in position and provided on its upper surface with a gasket, and a dust-cap secured on the top of said valve-head and contacting with the gasket in the retention-cap.

3. A pneumatic-tire valve comprising a valve-casing adapted for insertion into a tire-stem and provided at the outer end with a flange extending over the top of said stem, a valve-head threaded in said casing and provided with a flange extending over the end of the casing, a washer disposed between said flange and said casing, a collar fitted over the tire-stem and having lateral extensions for engagement with the wheel-rim, a retention-cap threaded on said collar and having an inwardly-disposed flange in contact with the flange on said valve-head, and a dust-cap threaded on the outer end of said valve-head and engaging with the top of said retention-cap.

In testimony that I claim the foregoing as my own I have hereto affixed my signature in the presence of two witnesses.

JOHN ESTEN KELLER, JR.

Witnesses:
R. B. GRINNELL,
JOHN L. MOWER.